United States Patent [19]

Shiraishi et al.

[11] Patent Number: 4,949,394

[45] Date of Patent: Aug. 14, 1990

[54] ADDRESSABLE PCM MUSIC BROADCAST RECEIVER

[75] Inventors: Kenichi Shiraishi, Yokohama; Hirokazu Kobayashi, Urawa; Yukihiko Miyamoto, Tama, all of Japan

[73] Assignee: Kabushiki Kaisha Kenwood, Tokyo, Japan

[21] Appl. No.: 311,977

[22] Filed: Feb. 17, 1989

[30] Foreign Application Priority Data

Feb. 29, 1988 [JP] Japan .................................. 63-47214

[51] Int. Cl.5 ......................... H04B 17/00; H04H 1/00

[52] U.S. Cl. ........................................... 455/2; 455/4; 455/158; 455/212

[58] Field of Search ....................................... 455/2-4, 455/68, 205, 226, 313, 158, 185, 212, 221; 358/84, 86; 375/36, 42, 94

[56] References Cited

U.S. PATENT DOCUMENTS 4,682,370 7/1987 Matthews ............................... 455/2
4,734,764 3/1988 Pocock et al. ......................... 358/86

OTHER PUBLICATIONS

Kazuo Kitagawa et al., "Digital Cable Audio System," Toshiba Review, 1985, vol. 40, No. 2, pp. 101–104.

*Primary Examiner*—Reinhard J. Eisenzopf
*Assistant Examiner*—Curtis Kuntz
*Attorney, Agent, or Firm*—Sixbey, Friedman, Leedom & Ferguson

[57] ABSTRACT

An addressable PCM music broadcast receiver which decodes a contraction identification code such as an address code allocated to the receiver and transmitted by a broadcasting station which performs a pay PCM music broadcast. The receiver is capable of receiving a contracted broadcast or channel on the basis of the decoded result. The receiver further has a demonstration function of receiving a non-contracted broadcast or channel for only a given time.

4 Claims, 2 Drawing Sheets

ADDRESSABLE PCM MUSIC BROADCAST RECEIVER

BACKGROUND OF THE INVENTION (a) Field of the Industrial Application

The present invention relates to addressable PCM music broadcast receivers.

(b) Prior Art

Conventionally, an addressable PCM music broadcast receiver does not positively use a given time required for decoding data such as a charging contraction identification code transmitted by a broadcasting station.

SUMMARY OF THE INVENTION

The present invention has been made in view of the above problem. It is an object of the present invention to provide an addressable PCM music broadcast receiver having a so-called a demonstration function in which the receiver uses a time required for the receiver to decode data such as a contraction identification code to receive a non-contracted broadcast or channel for only that time.

The present invention is an addressable PCM music broadcast receiver which decodes a contraction identification code such as an address code allocated to the receiver and transmitted by a broadcasting station which performs a pay PCM music broadcast, the receiver being capable of receiving only a contracted broadcast or channel on the basis of the decoded result, characterized by that a demonstration function of receiving a non-contracted broadcast or channel for only a given time.

According to the present invention, the receiver has the demonstration function in which the receiver uses a given time required for the receiver to decode data such as a contraction identification code transmitted by a broadcasting station to thereby receive a non-contracted broadcast or channel for only that time. Therefore, the subscriber can enjoy many broadcasts or channels tentatively.

The receiver has the display for displaying the reception of a contracted broadcast or channel, the reception in accordance with the demonstration function, or the reception of a non-contracted broadcast or channel, so that the reception state is easily identified.

BRIEF DESCRIPTION OF DRAWINGS

An addressable PCM music broadcast receiver according to the present invention will now be described with reference to FIGS. 1–3.

DETAILED DESCRIPTION OF EMBODIMENT

Figure 1:
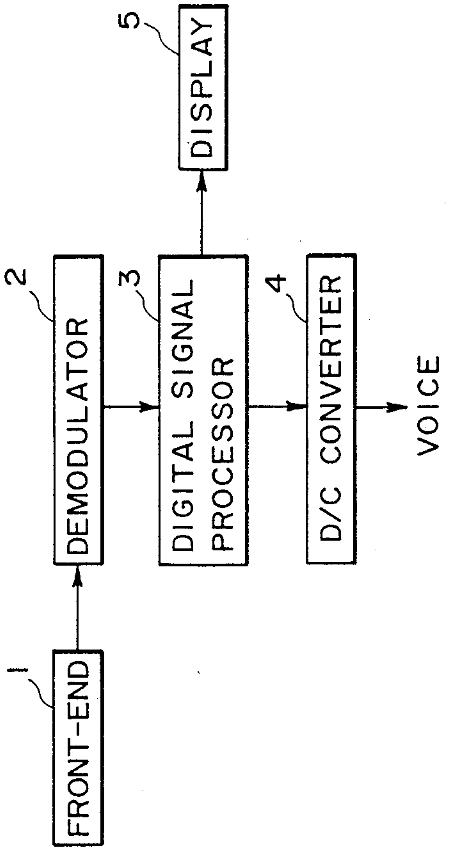
FIG. 1 is a block diagram of the essential portion of the receiver according to the present invention.

In the drawings, reference numeral 1 denotes a front-end; 2, a demodulator; 3, a digital signal processor; 4, a D/A converter; and 5, a display.

The operation of the receiver will now be described with reference to FIG. 1.

Figure 2:
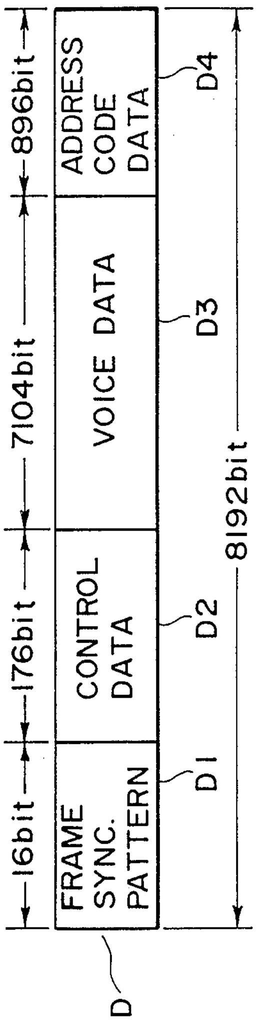
FIG. 2 illustrates the format of one frame of data received by the receiver.

An RF signal (not shown), subjected to a QPSK (Quadrant Phase-Shift Keying) modulation, is converted to an IF signal by band selection in front-end 1, and then to a digital signal by a demodulator 2. The digital signal processor 3 retrieves an address code on the basis of address code data D4 as a contraction identification code from the formatted data D as shown in FIG. 2 and processes the voice data D3 transmitted. The voice data D3 is then converted by the D/A converter 4 to voice and output.

During the time when the digital signal processor 3 is retrieving the address code data D4, the display 5 displays the demonstration reception, for example, "demonstration service is now being provided".

When the retrieval of all the addresses by the digital signal processor 3 has completed, the voice signal output is controlled in accordance with the processed results, and the display 5 displays whether the broadcast or channel under reception is a contracted one or not.

FIG. 2 illustrates the format of one digital data frame for use in the addressable PCM music broadcast receiver according to the present invention.

A series of data is constituted by unit frames, each including data D of one frame constituted by a 16-bit frame synchronizing pattern D1 indicative of the head of the frame, 17-bit control data D2 entraining thereon data used for providing various control operations and indicating the form of broadcast such as a stereophonic broadcast or a bilingual broadcast, 7104-bit voice data D3, and 896-bit address code data D4 entraining thereon an address code such as a contraction identification code.

The digital data processor 3 which decodes data D will now be described with reference to FIG. 3.

Figure 3:
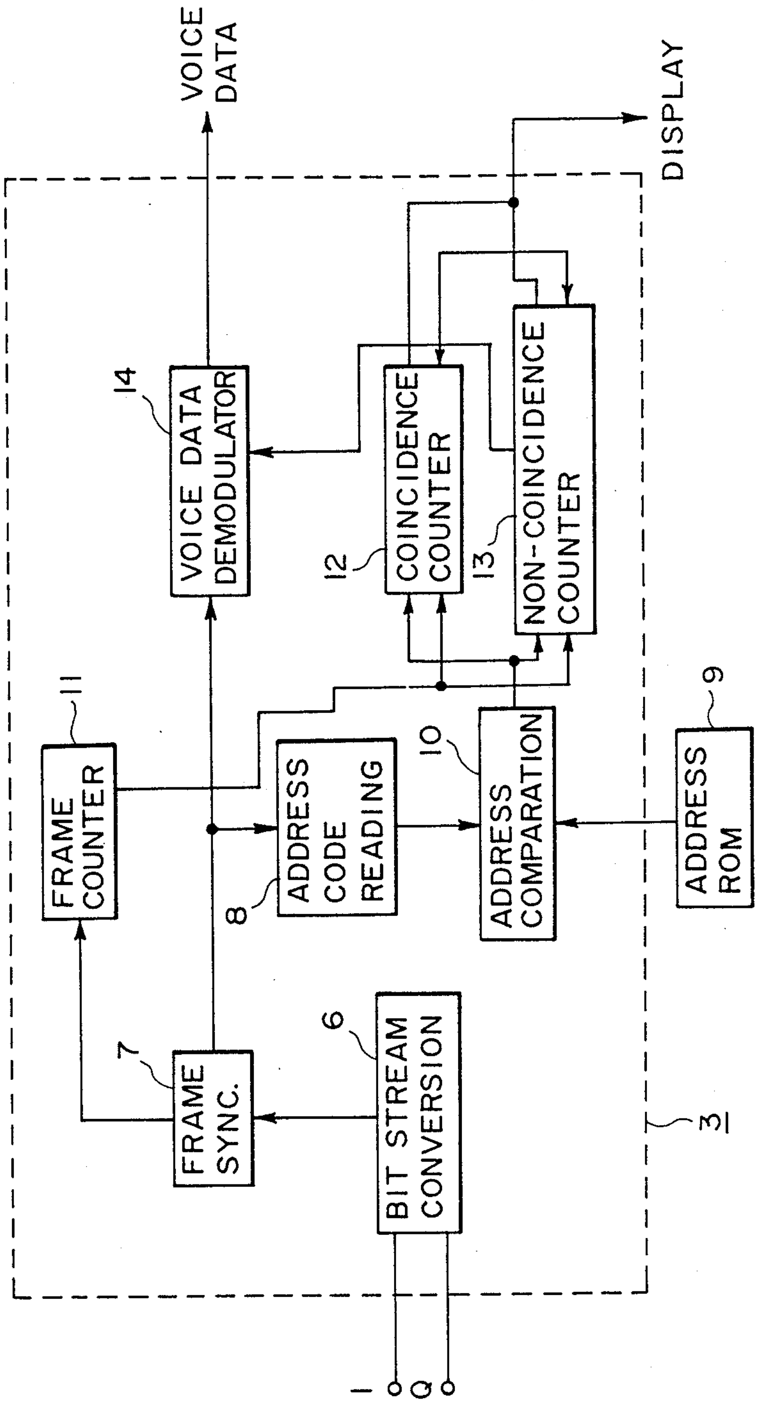
FIG. 3 is a block diagram of a digital signal processor which decodes the format of the data.

In FIG. 3, reference characters I and Q denote the in phase and orthogonal signals, respectively, output from the demodulator 2 and input to a bit stream converter 6.

The I and Q bit signals are converted by bit stream converter 6 to serial data, which are then input to a frame synchronizing circuit 7 to thereby locate the head of the frame.

This causes the address code data D4 stored in the 7297th to 8192th bits of data D to be delivered to and stored in an address code reader 8.

The address code allocated to each of the receivers is written in an address ROM 9, an address comparator 10 fetches an address code from the address ROM 9, and an address comparator 10 compares the address code from the address ROM 9 and the address code data D4 read by the address code reader 8.

The address code data D4 is transmitted repeatedly at periods of predetermined number of frames by the broadcasting station, so that the address comparator 10 outputs the result of the address retrieval at preset periods of frame on the basis of the output of a frame counter 11 which counts the periods.

If the address code data D4 and the address code from the address ROM 9 coincide as the result of the address retrieval, an coincidence counter 12 is incremented while if not, a non-coincidence counter 13 is incremented to provide the result of retrieval as to the presence of the contraction.

When the coincidence counter 12 or non-coincidence counter 13 arrives at a predetermined value, a necessary signal is delivered to the display in accordance with the output from the coincidence counter 12 or non-coincidence counter 13 to thereby perform a necessary indication and control a voice data demodulator 14.

The addressable receiver is in the reception of a broadcast for a predetermined time interval from the time when the retrieval of all the addresses has completed to the time when the coincidence counter 12 or the non-coincidence counter 13 outputs its result because the selector (not shown) of the receiver selects and receives the broadcast or channel, regardless of the presence of contraction.

Under such conditions, if, for example, the non-coincidence counter 13 arrives at a predetermined value, it controls a mute circuit (not shown) of a voice data demodulator 14 to suppress the voice output and to switch the display of the display 5 from demonstration service to non-contraction.

Conversely, if the coincidence counter 12 has arrived at a predetermined value, the output signal of the coincidence counter 12 is delivered to the display to thereby switch the display from the demonstration service to the contraction. In this case, the voice signal continues to be output.

The service time for the demonstration reception will now be described.

The demonstration service time ST is as follows.

$$ST = t \times F \times n$$

where t is the transmission time for one frame,

F is the number of frames for one period of transmitted address code data D4; and n is the preset frequency of retrievals.

Since one frame of data D consists of 8192 bits in total as shown in FIG. 2, the transmission time t for one frame is $8192/8.192 \times 10^6 = 10^{-3}$ sec where the transmission rate of the addressable PCM music broadcasting system is 8.192 Mbits/sec, the number of frames for one period of the address code data D4 is 5000, the preset frequency of retrievals n is 3.

Therefore, the service time ST during which the demonstration reception is possible is $$\begin{aligned} ST &= 10^{-3} \times 5000 \times 3 \\ &= 15 \text{ sec} \end{aligned}$$

so that it is possible to enjoy a non-contracted broadcast or channel tentatively by the demonstration reception for 15 seconds regardless of the presence of contraction.

In the particular embodiment, the coincidence counter 12 and non-coincidence counter 13 with the same predetermined value are provided such that one of the counters which has first arrived at the predetermined value resets the other. Therefore, this embodiment performs a decision-by-majority operation, and no malfunction occurs even if there arises errors in data.

If there occur errors in the address retrieval before the coincidence counter 12 or the non-coincidence counter 13 arrives at their predetermined values, the service time ST for the demonstration reception is prolonged by the frequency of the errors.

The addressable PCM music broadcast receiver has a demonstration function in which the receiver uses a predetermined time required for decoding data such as a contraction identification code transmitted by a broadcasting station to receive a non-contracted broadcast or channel for only that time. Therefore, the subscriber can enjoy many broadcasts or channels tentatively.

The receiver also includes the display which displays the reception of a contracted broadcast or channel, the reception in accordance with the demonstration function or the reception of a non-contracted broadcast or channel to thereby facilitate the identification of the state of reception.

What is claimed is:

1. A receiver for reproducing a music program from an addressable PCM music broadcast signal which includes music data in every frame and contract code data for each of a predetermined number of frames, the receiver comprising:

demodulating means for demodulating the music data and the addressable music broadcast signal to reproduce the music program;

read-out means for reading out the contract code data;

comparing means for comparing the read-out contract code data with a code assigned to the receiver for each of the predetermined number of frames;

counting means in response to the comparing means for counting coincidence events in which the read-out contract code data coincides with the code assigned to the receiver and non-coincidence events in which the read-out contract code data does not coincide with the code assigned to the receiver, and generating a demonstration service mode indication signal until either of the counts of the coincidence events or non-coincidence events reaches a predetermined count, said counting means further generating a contract program service mode indication signal when the count of the coincidence events reaches the predetermined count first and generating a muting signal to said demodulating means to inhibit the music program reproduction when the count of the non-coincidence events reaches the predetermined count first.

2. A receiver according to claim 1, wherein said counting means generates a non-contract program service mode indication signal with the muting signal.

3. A receiver according to claim 1, wherein said counting means includes a coincidence counter for counting the coincidence events and a non-coincidence counter for counting the non-coincidence events.

4. A receiver according to claim 3, wherein each of the counters includes means for resetting the other upon the predetermined counting.

* * * * *